Patented Jan. 30, 1934

1,944,986

UNITED STATES PATENT OFFICE 1,944,986

VAT DYESTUFFS OF THE ANTHRAQUINONE-ACRIDONE SERIES AND A PROCESS OF PREPARING THEM

Georg Kränzlein, Heinrich Vollmann, and Hermann Boedeker, Frankfort - on - the - Main-Hochst, and Hans Becker, Hofheim in Taunus, Germany, assignors to General Aniline Works, Inc., New York, N. Y., a corporation of Delaware No Drawing. Application April 4, 1932, Serial No. 603,202, and in Germany April 24, 1931

4 Claims. (Cl. 260—37)

This invention relates to new vat dyestuffs and a process of preparing them.

More particularly it relates to new, clear yellowish-green to greenish-blue or violet vat dyestuffs of good fastness properties which are derived from 4- or 5-aminoanthraquinone-2.1-acridone of the following formula:

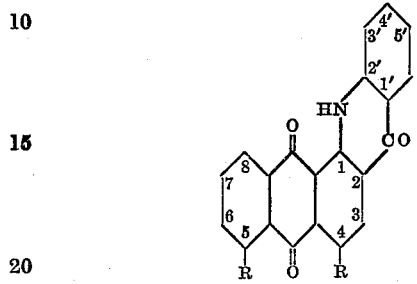

wherein one R stands for hydrogen and the other R for a NH$_2$-group.

The new vat dyestuffs are obtainable by causing a compound of the above formula or a substitution product thereof to react with a halogenated aromatic or aromatic-aliphatic ketone or a poly-ketone having a chain- or cyclic structure but no quinone character, the reaction occurring between the amino group of the one compound and the halogen atom of the other compound.

The reaction is advantageously carried out in the presence of a diluent and an acid binding agent by heating the reaction components, if required, to the boiling point of the diluent.

When using a ketone containing 2 halogen atoms, it is possible to conduct the reaction so that 1 mol or 2 mols of the acridone compound of the above formula react with 1 mol of the halogenated ketone. In some cases the reaction occurs in such a way that besides the double condensation product there is simultaneously obtained a halogen containing primary condensation product.

The new products obtainable according to this invention may be characterized by the following general formula:

B—A—B wherein one of the B's represents one of the univalent residues of the following formulae:

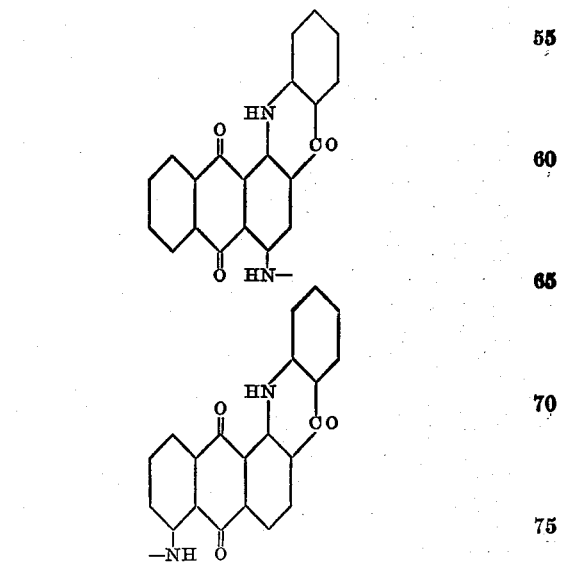

and the other B stands for the same residue or hydrogen or halogen and A represents one of the bivalent residues of the following formulae:

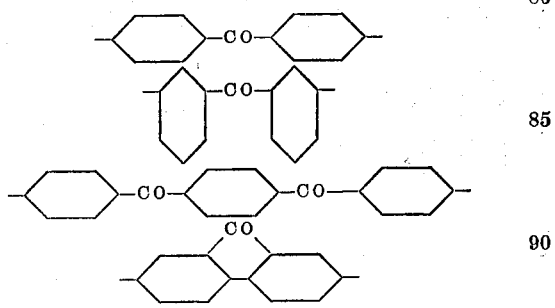

Those of the dyestuffs which are obtainable from 2 mols of aminoacridone and one mol of a dihalogenketone of the type of p.p'-dihalogenbenzophenone are particularly distinguished by a good affinity for the fiber.

The following examples serve to illustrate the invention, but they are not intended to limit it thereto, the parts being by weight:

(1) 70 parts of 4.4'-dibrombenzophenone, 122 parts of 4 - aminoanthraquinone - 2.1 - acridone, 120 parts of sodium carbonate and 10 parts of copper acetate are heated to boiling for 6–7 hours in 3000 parts of nitrobenzene, while well stirring. The reaction product, during the boiling operation, precipitates for the greatest part in the form of crystals and, after the reaction is completed, is filtered by suction from the hot nitrobenzene mother lye. In order to remove the by-products, the mass remaining on the filter may be washed with alcohol and hot water or it may be steam-distilled. The dyestuff which is obtained in the form of a dark-green, crystalline powder crystallizes from nitrobenzene in the form of green needles and dissolves in concentrated sulfuric acid to a brownish-orange solution. It dyes the vegetable fiber from a violet-red vat clear, yellowish-green tints of good fastness properties. The dyestuff has the following probable formula:

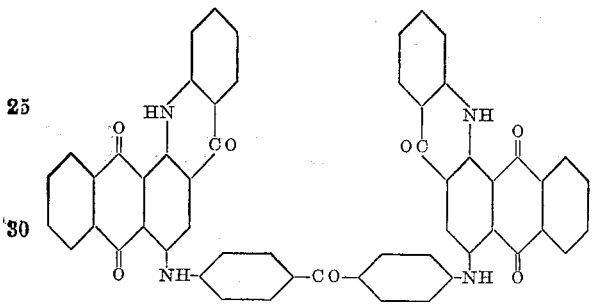

From the above mentioned nitrobenzene mother lye a dyestuff containing bromine may be obtained which probably has been formed by condensation of only one mol of 4-aminoanthraquinone-2.1-acridone with 1 mol of 4.4'-dibrombenzophenone.

Instead of the dibromo-ketone there may be used in the above example with the same good result the corresponding dichlorobenzophenone.

By causing in an analogous manner 3.3'-dibrombenzophenone to act upon 4-aminoanthraquinone-2.1-acridone, a green dyestuff of a considerably more bluish hue is obtained.

(2) 100 parts of 1.4-di-(para-brombenzoyl)-benzene (obtainable from terephthaloyl chloride and brombenzene, melting at 265° C.), 130 parts of 4 - amino - anthraquinone - 2.1 - acridone, 160 parts of sodium carbonate and 10 parts of copper oxide are heated to boiling in 2500 parts of naphthalene. The color of the melt which is at first blue, after some time, turns green. The reaction finished, the whole is diluted with hot nitrobenzene, allowed to cool to about 100° C. and filtered with suction. The product is worked up as described in Example 1. The dyestuff thus obtained in the form of shimmering green needles dyes cotton from a violet-red vat intense yellowish-green tints of good fastness properties. The dyestuff has the following probable formula:

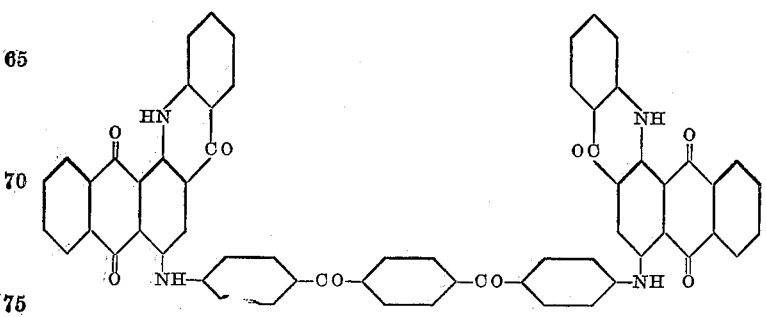

(3) By causing to react, in a manner analogous to that described in the preceding examples, 20 parts of 4-amino-anthraquinone-2.1-benzene-3'.5'-dichloro-acridone with 14 parts of para-brombenzophenone, a dyestuff is obtained which crystallizes in the form of bluish-green needles. It dyes cotton from a violet-brown vat intense green tints. The dyestuff has the following probable formula:

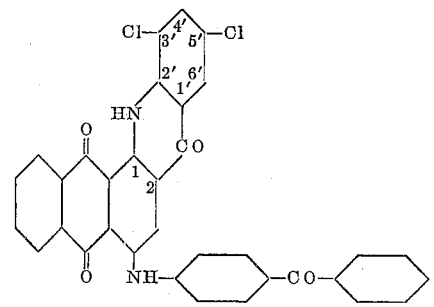

(4) 90 parts of 2.7-dibromfluorenone and 150 parts of 4-amino-2.1-anthraquinoneacridone are heated to boiling for 1½ hours while adding 150 parts of sodium carbonate and 10 parts of copper acetate in 3000 parts of nitrobenzene. The condensation product which precipitates in the form of crystals is worked up as indicated in Example 1. The dyestuff yields from a violet-red vat yellowish-green dyeings. It has the following probable formula:

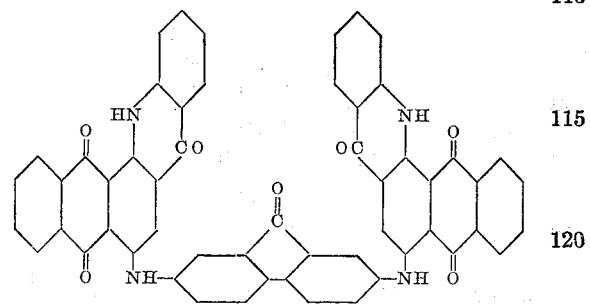

(5) 68 parts of 5-aminoanthraquinone-2.1-acridone, 37 parts of p.p'-dibrombenzophenone, 33 parts of sodium acetate and 1 part of copper acetate are heated to boiling in 1000 parts of nitrobenzene, while stirring, until the red color of the solution has been superseded by reddish-violet. After cooling, the violet needles which have been precipitated are filtered with suction, washed with nitrobenzene, alcohol and hot water and steam-distilled. The dyestuff thus obtained dissolves in concentrated sulfuric acid to a brownish-yellow solution and dyes the vegetable fiber from a red-violet vat violet tints of good fastness properties, especially of good fastness to water-drops. The dyestuff has the following probable formula:

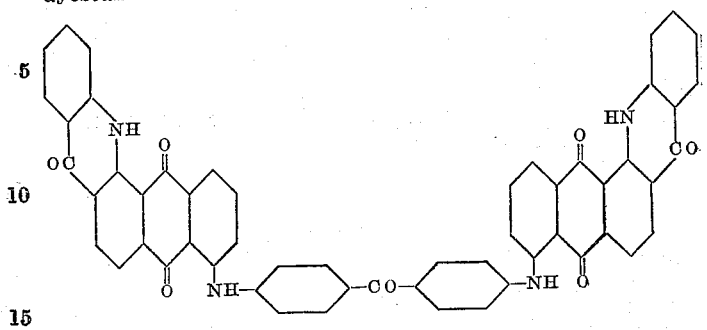

(6) 17 parts of 5-aminoanthraquinone-2.1-acridone, 12 parts of 1.4-di-(para-brombenzoyl)-benzene, 10 parts of sodium acetate and 1 part of copper acetate are heated to boiling for 7 hours in 400 parts of nitrobenzene. The reaction mass is worked up as described in Example 1. The dyestuff obtained in the form of a dark violet crystalline powder dyes cotton from a violet vat red-violet tints. It has the following probable formula:

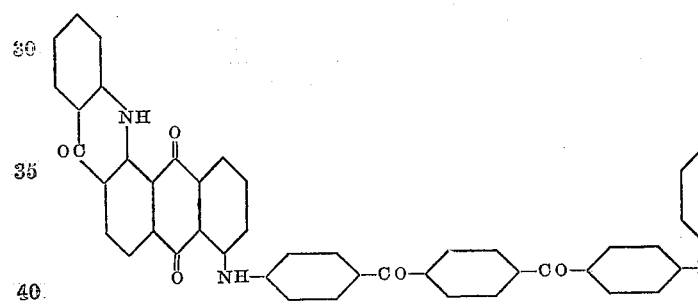

We claim:
1. The compounds of the following general formula:

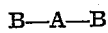

wherein one of the B's stands for one of the monovalent residues of the following formulae:

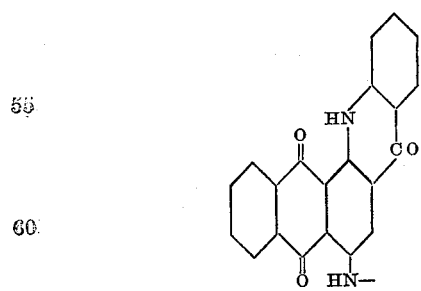

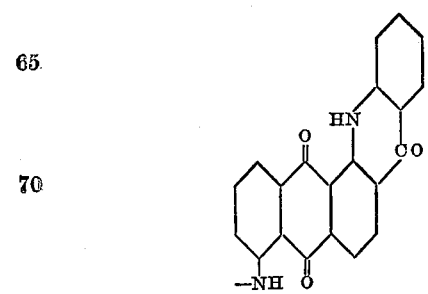

and the other B stands for the same residue or hydrogen or halogen and wherein A stands for one of the bivalent residues of the following formulae:

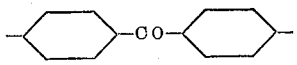

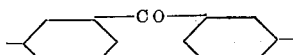

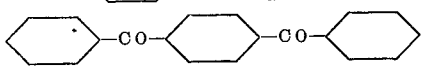

said compounds being clear yellowish-green to greenish-blue or violet vat dyestuffs of good fastness properties.

2. The compounds of the following general formula:

wherein one of the B's stand for one of the monovalent residues of the following formula:

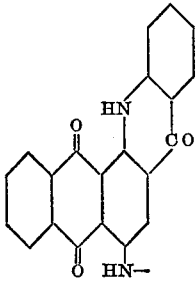

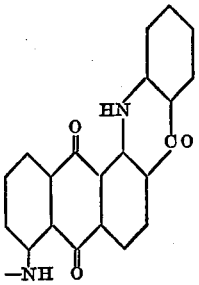

and the other B stands for the same residue or hydrogen or halogen and wherein A stands for the bivalent residue of the following formula:

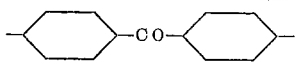

said compounds being clear yellowish-green to greenish-blue or violet vat dyestuffs of good fastness properties.

3. The compound of the following probable formula:

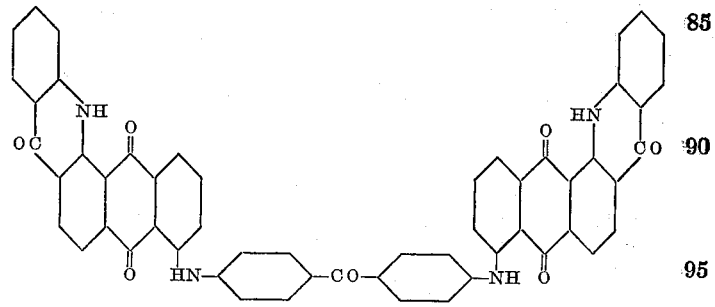

dissolving in concentrated sulfuric acid to a brownish-yellow solution and dyeing the vegetable fiber from a red-violet vat violet tints of good fastness properties, especially to water-drops.

forming a dark-green crystalline powder, crystallizing from nitrobenzene in the form of green needles, dissolving in concentrated sulfuric acid to a brownish-orange solution and dyeing the vegetable fiber from a violet-red vat clear yellowish-green tints of good fastness properties.

4. The compound of the following probable formula:

GEORG KRÄNZLEIN.
HEINRICH VOLLMANN.
HERMANN BOEDEKER.
HANS BECKER.